No. 680,380. Patented Aug. 13, 1901.
M. A. HYDE.
MEANS FOR PRESERVING SEALS IN TRAPS OF WATER CLOSETS, URINALS, WASHBASINS, SINKS, &c.
(Application filed Oct. 13, 1900.)
(No Model.)
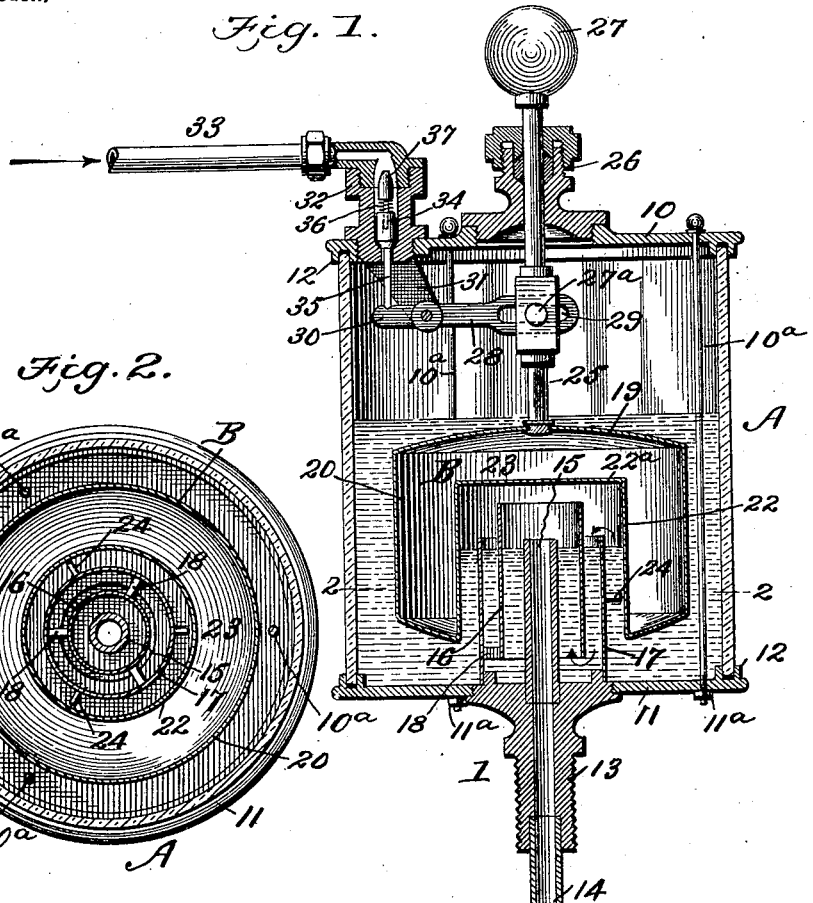
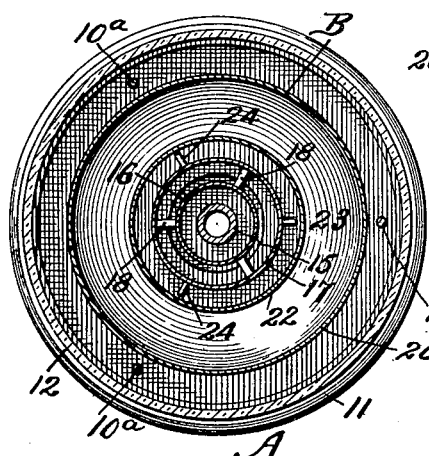
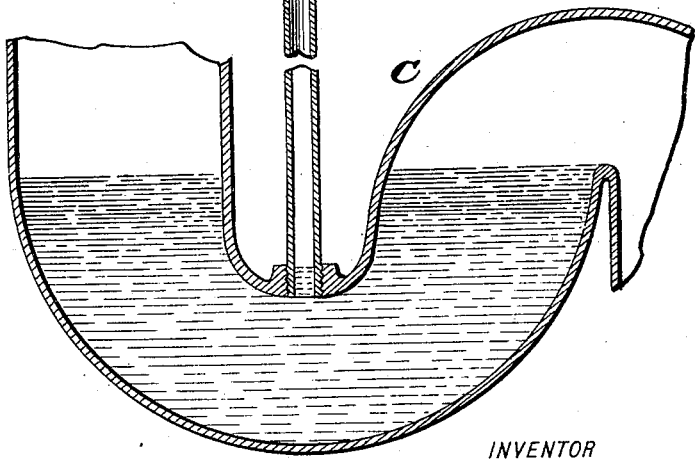
WITNESSES:
M. D. Blondell
Chas. R. Wright
INVENTOR
Mary A. Hyde.
BY Munn & Co.
ATTORNEYS
THE NORRIS PETERS CO., PHOTO-LITHO., WASHINGTON, D. C.

UNITED STATES PATENT OFFICE.

MARY A. HYDE, OF NEW YORK, N. Y.

MEANS FOR PRESERVING SEALS IN TRAPS OF WATER-CLOSETS, URINALS, WASHBASINS, SINKS, &c.

SPECIFICATION forming part of Letters Patent No. 680,380, dated August 13, 1901.

Application filed October 13, 1900. Serial No. 32,944. (No model.)

*To all whom it may concern:*

Be it known that I, MARY A. HYDE, a citizen of the United States, and a resident of the city of New York, borough of Manhattan, in the county and State of New York, have invented a new and Improved Means for Preserving the Seal in Traps of Water-Closets, Urinals, Washbasins, Sinks, &c., of which the following is a full, clear, and exact description.

The purpose of the invention is to provide means for maintaining a supply of water in readiness to be delivered automatically or manually into a seal or trap of a water-closet, washbasin, urinal, sink, or the like whenever the water in the trap is drained or siphoned off and to simplify and improve upon the construction of such means, especially as presented in the patent granted to J. P. Hyde November 13, 1883, No. 288,573.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a vertical section through the device, and Fig. 2 is a horizontal section taken substantially on the line 2 2 of Fig. 1.

A represents a reservoir the body portion of which is usually of glass, although metal may be used, if desired, and the body of the reservoir is provided with an upper head 10 and with a lower head 11, connected by bolts 10ª, having suitable heads and nuts 11ª. Each reservoir-head at or near the marginal portion of its inner face is provided with a U-shaped rib 12, in which the upper and lower edges of the body of the reservoir are fitted in an air-tight and water-tight manner. A hub 13 is connected with the central portion of the bottom head 11 of the reservoir, and this hub 13 may be attached to the body portion of a trap at a point between its upper and lower members, or a connection may be made with the trap through the medium of an attached pipe 14, so that the reservoir may be placed below the floor or at any desired point above it. As shown in the drawings, the connection is made with the trap C by means of the pipe 14.

A stand-pipe 15 is connected with the upper portion of the hub 13, and this stand-pipe is carried up a certain distance within the reservoir A, as shown in Fig. 1. Two tubular jackets 16 and 17, located one within the other, surround the stand-pipe 15, and suitable spaces intervene the stand-pipe and the inner jacket 16 and the inner jacket 16 and outer jacket 17. The inner jacket 16 extends above the upper end of the stand-pipe, while the outer jacket at its upper end is on a level with the top of the stand-pipe, as is shown in Fig. 1. The outer jacket 17 is connected either with the inner face of the hub 13 or with the inner surface of the lower head 11, while the inner jacket 16 does not extend to the bottom head 11 or the hub 13 and is supported by a spider 18 or its equivalent, which serves to connect the two jackets, as illustrated in the drawings. A reservoir A is adapted to contain a certain amount of water, and under certain conditions the water flows from the main portion of the reservoir into the space between the two jackets 16 and 17 and then up into the space between the inner jacket and stand-pipe and into the inlet end of the latter.

A bell B is used in connection with the tubular jackets 16 and 17 and the stand-pipe. This bell B is of less diameter than the diameter of the body of the reservoir A, and the said bell preferably consists of an outer section, comprising an arched top 19, cylindrical sides 20, and a bottom 21, inclined from the said sides downward and inward to meet an inner cylindrical wall 22, as is shown in Fig. 1, and a cap-plate 22ª is provided for the upper portion of the inner cylindrical wall 22 of the said bell. Under such construction the bell is provided with an air-chamber 23, whereby the bell will act quickly when serving as a float, and the construction of the bottom portion of the bell enables it to offer the least possible amount of resistance to the water. The chamber formed in the bottom portion of the bell by the double side walls thereof is of greater transverse dimension than the transverse dimension of the outer jacket 17, so that a space occurs between the said outer jacket and the inner surface of the inner wall 22 of the bell. When the bell reaches its lowest position, it rests upon the upper end of the inner jacket 16. The bell is guided in its vertical movement by lugs 24, which are formed upon or are attached to the outer surface of the outer jacket 17. A stem 25 is secured to the upper central portion of the bell. This stem is mounted to slide in a suitable gland 26, secured to the upper head 10 of the reservoir over an opening therein, and preferably the upper end of the stem is provided with a handle 27, and a pin 27ª is located on the stem at a point near its lower end. A lever 28 is employed in connection with the stem 25 of the bell. This lever is provided at its inner end with a longitudinal slot 29, through which the pin 27ª is loosely passed, and in the upper surface of the lever 28, at or near its outer end, a recess 30 is formed.

The lever 28 is fulcrumed upon an arm 31, which extends down into the reservoir A through an opening at its top, and said arm 31 is connected with the lower portion of the valve-casing 32, connected by a pipe 33 with any source of water-supply. A valve 34 is located in the valve-casing 32 and has a conical seat in the bottom of a chamber formed in said valve-casing, as is illustrated in Fig. 1. A stem 35 is attached to the valve 34, the stem projecting beyond the top and bottom portion of the valve, and the lower end of the stem 35 normally rests in the recess 30 produced in the lever 28, while a head 37, preferably of conical shape at its upper end, is located at the upper portion of the said stem 35. A spring 36 is coiled around the upper portion of the stem between the head 37 of the stem and the valve 34. The spring 36 serves as a cushion for the valve 34, which has a limited movement on the stem 35. The valve 34 is normally held seated by the pressure of the water in the inlet-pipe 33.

So long as the trap is sealed, the lower end of the pipe 14 will be closed by the water in the trap. At this time the bell will be raised in the body of water in the reservoir some distance above the upper end of the jacket 16, the valve 34 will be closed by the water-pressure at the inlet 33, and the air will be compressed under the bell and in the stand-pipe and the water held at a point below the upper end of the stand-pipe, as shown in Fig. 1.

Should the water drain or siphon off from the trap, so as to open the lower end of the pipe 14, the air under the bell and in the stand-pipe being no longer under pressure the atmospheric pressure upon the body of water within the reservoir will cause the water to rise in the space between the bell and jacket 17 and flow down between the two jackets, up between the jacket 16 and stand-pipe 15 and into the latter, and down the same to again fill and seal the trap, and at such time the bell in dropping will cause the valve 34 to open, as the recessed end of the lever 28 will be raised and will bear upward against the stem 35 of the valve 34, unseating the latter, permitting sufficient water to enter the reservoir to float the bell to its original position and allow the valve 34 to seat itself. It will be seen that prior to the unsealing of the trap the air within the bell and in the stand-pipe will be compressed, so as to assist in holding the bell raised and to prevent the water in the reservoir from rising and flowing into the stand-pipe. As soon, however, as the equilibrium of pressure is destroyed by reason of the water in the trap becoming lower than the lower end of the pipe 14, the water will then rise in the space between the bell and jacket 17 until it reaches the top of said jacket, when it flows down between the jackets, up between the jacket 16 and stand-pipe, and into the stand-pipe and through the same to the trap. As the water flows out the bell descends until it finally rests upon the top of the jacket 16, and this will take place before the level of the water in the reservoir is below the lower end of the bell—that is to say, before the siphonic action is broken. As soon as the water is below the lower end of the bell or the siphonic action is broken the water will cease flowing through the stand-pipe, and the water in the space between the stand-pipe and jacket 16 will recede and rise in the space between the jackets until it is on a level in the said spaces, thus forming a seal as an additional precaution to prevent the escape of sewer-gas. The trap is found by experience to operate with more force and with greater precision than a trap constructed in the manner disclosed in the patent to Hyde above referred to, apparently for the reason that the construction avoids resealing by water at the edge of the bell when the siphonic action is broken before the intertrap-space is fully supplied with air, only sealing at the bottom of jacket 16. This resealing affects the condition of the air in the intertrap-space, (tending to diminish its tension.) This effect is produced in the construction shown by the falling back at the moment the siphonic action is broken of a comparatively small volume of water—viz., that between stand-pipe 15 and jacket 16—and the ultimate consequence of this rarefying effect is distributed over the larger body of air contained in the increased water-trap space which results from the uncovering of the top of the jacket 16. Thus a relatively small falling volume of water tending to rarefy the air within the intertrap-space is associated with a relatively large body of air subjected to such rarefying effect, thus reducing the rarefying effect. The bell may be operated by hand through the medium of the stem 25 and handle 27 to supply the trap with fresh water. When the bell is forced down manually, the water will rise in the spaces between the jackets and will be forced into the stand-pipe 15, breaking the column of air, and consequently water in the trap will be forced out and the trap receive a fresh supply.

Having thus described my invention, I claim as new and desire to secure by Letters Patent—

1. The combination, with a reservoir, means for connecting said reservoir with the water seal of a trap, a stand-pipe within the reservoir, in communication with the connection between the reservoir and trap, jackets located one within the other and around the said stand-pipe, the outer jacket being open at its top only and the inner jacket being open at both its bottom and its top, of a bell having double walls and an air-space between the walls, a stem connected with the bell and having guided movement in a head of the reservoir, a lever having sliding connection with the stem, and a pressure-valve the casing of which is located at the exterior of the reservoir, and in communication with the interior thereof, which pressure-valve is operated through the medium of said lever, for the purpose described.

2. The combination, with a reservoir, a connection whereby the reservoir may be attached to a water-seal trap, a stand-pipe within the reservoir in communication with said connection, jackets located one within the other around the stand-pipe, the outer jacket at its upper edge being substantially in a horizontal plane with the upper edge of the stand-pipe, the upper edge of the inner jacket extending above the stand-pipe, the outer jacket having an open top and closed bottom and the inner jacket being open at the top and bottom, and a bell having sliding movement over both jackets, the said bell being provided with double walls, an air-space being between the walls and the tapering bottom, of a stem having sliding movement in a head of the reservoir, a lever pivoted within the reservoir, having a slot at one of its ends, a pin passed through said stem into the slot of the lever, a valve-casing connected with a source of water-supply and connected likewise with the interior of the casing, a valve within the said casing, normally seated by the water-pressure, and a stem attached to said valve, extending within the reservoir, and operated by the said lever.

3. The combination, with a reservoir adapted for connection with a water-seal trap, a stand-pipe in communication with said connection, concentric jackets surrounding the stand-pipe, the outer jacket receiving water at the top and the inner jacket at the bottom the said inner jacket being open at top and extending above the outer jacket, and a bell having movement over said jackets and adapted to be seated on the inner jacket, of a guide for the bell, a pressure-valve connected with the interior of the reservoir, and a lever for operating the pressure-valve, which lever is operated by the guide for said bell, as described.

In testimony whereof I have signed my name to this specification in the presence of two subscribing witnesses.

MARY A. HYDE.

Witnesses:
MARGERY HOWARD,
JOHN J. RYAN.